United States Patent
Klein

[15] 3,706,479
[45] Dec. 19, 1972

[54] NONSKID BRAKE SYSTEM FOR MOTOR VEHICLE WITH PRESSURIZED HYDRAULIC SYSTEM

[72] Inventor: Hans-Christof Klein, Hattersheim am Main, Germany

[73] Assignee: Alfred Teves GmbH, Frankfurt am Main, Germany

[22] Filed: May 13, 1970

[21] Appl. No.: 37,420

Related U.S. Application Data

[63] Continuation of Ser. No. 762,601, Sept. 25, 1968, abandoned.

[30] Foreign Application Priority Data

Sept. 26, 1967 Germany..................T 34885

[52] U.S. Cl. ..............303/21 F, 188/181 A, 188/345, 188/354, 303/10
[51] Int. Cl. .................................B60t 8/12
[58] Field of Search .........188/181, 106 P, 34 S, 349, 188/354, 358; 303/6 C, 10, 21 F, 61

[56] References Cited

UNITED STATES PATENTS

| | | | |
|---|---|---|---|
| 2,887,187 | 5/1959 | Fletcher et al. | 188/359 |
| 3,521,934 | 7/1970 | Leiber | 303/21 F |
| 3,524,683 | 8/1970 | Stelzer | 303/21 F |

Primary Examiner—Milton Buchler
Assistant Examiner—Stephen G. Kunin
Attorney—Karl F. Ross

[57] ABSTRACT

A nonskid brake system for a motor vehicle with a pressurized hydraulic system such as power steering or brakes or a hydraulic load leveler, having a deceleration-responsive valve between the brake control valve for draining pressure from the wheel brake into a reservoir. In the case in which a master cylinder is used, the valve refills the wheel brake with fluid on termination of a nonskid regulating operation by briefly connecting the wheel brake to the pressurized system.

11 Claims, 6 Drawing Figures

NONSKID BRAKE SYSTEM FOR MOTOR VEHICLE WITH PRESSURIZED HYDRAULIC SYSTEM

CROSS-REFERENCE TO COPENDING APPLICATION

This application is a continuation of application Ser. No. 37,420 filed May 13, 1970, now abandoned.

FIELD OF THE INVENTION

My present invention relates to a nonskid brake system for a motor vehicle with a pressurized hydraulic system.

BACKGROUND OF THE INVENTION

The use of pressurized hydraulic systems in motor vehicles, such as in power-steering or gear-shifting arrangements, auxiliary equipment such as automatic tail gates, hydraulic gear-change or speed-varying transmissions, torque converters or hydrodynamic decelerators, and even the lubricating systems of an automotive vehicle engine—in short any system using a constant elevated hydraulic pressure to operate a load and commonly used in automotive vehicles—is now widespread. Vehicles of late, especially trucks and other heavy-duty vehicles, are also increasingly provided with controlled brake systems designed to reduce or prevent skidding.

These nonskid brake systems generally comprise a deceleration-responsive valve between the master cylinder or brake-control valve and the wheel brake for draining pressure from the brake when vehicle deceleration exceeds a certain predetermined limit tending to cause a skid.

OBJECT OF THE INVENTION

It is an object of my invention to provide an improved nonskid brake system advantageously applicable to motor-vehicles having a pressurized hydraulic system of the character described.

SUMMARY OF THE INVENTION

Surprisingly I have found that providing the above-mentioned deceleration-responsive valve with a connection to the fluid reservoir of a pressurized hydraulic system permits the deceleration-responsive antiskid system to operate with greater effectiveness than characterizes earlier arrangements. Also, the necessity of complicated apparatus for storing and restoring this drained-off fluid is obviated.

My system is particularly applicable to a brake system wherein a brake-pedal-operated valve is connected between a pressurized fluid accumulator and a wheel brake, and operation of this brake-control valve actuates the wheel brake. With such a system my deceleration-responsive valve can disconnect the wheel brake from the brake-control valve and drain this brake into the brake-system reservoir which also serves the auxiliary load.

My system is further applicable to a normal master cylinder brake system, whether or not this master cylinder is equipped with a hydraulic or pneumatic power brake. For such a system, there is an additional problem in that after a skid-preventing brake regulation operation, there is the possibility that the brake system will have lost so much brake fluid that subsequent braking will become dangerous and irregular. This is to say that the customary slight pressure maintained in the brake system to keep pedal travel at a minimum and therefore to allow substantially immediate actuation of the brakes on actuation of the brake pedal would be lost. This can be compensated, according to the invention by providing that the deceleration-responsive valve has a fourth connection leading to the pressurized system itself and which is briefly connectible with the wheel brake after a regulation operation to restore pressure in the same to the desired level. A pressure-regulating valve or throttle is preferably connected in this fourth line of fluid flow.

A further feature of my system is that it is equally applicable to single- or dual-network brake systems wherein the necessary apparatus can merely be duplicated with no new problems being added.

Preferably the fluid-pressure source for my brake system is an independent accumulator connected through a check valve with the before-described pressurized hydraulic system so that it is always at a constant pressure to give ideal braking characteristics.

DESCRIPTION OF THE DRAWING

Several embodiments of my invention will be described in the following, with reference to the drawing in which.

SPECIFIC DESCRIPTION

Figure 1:
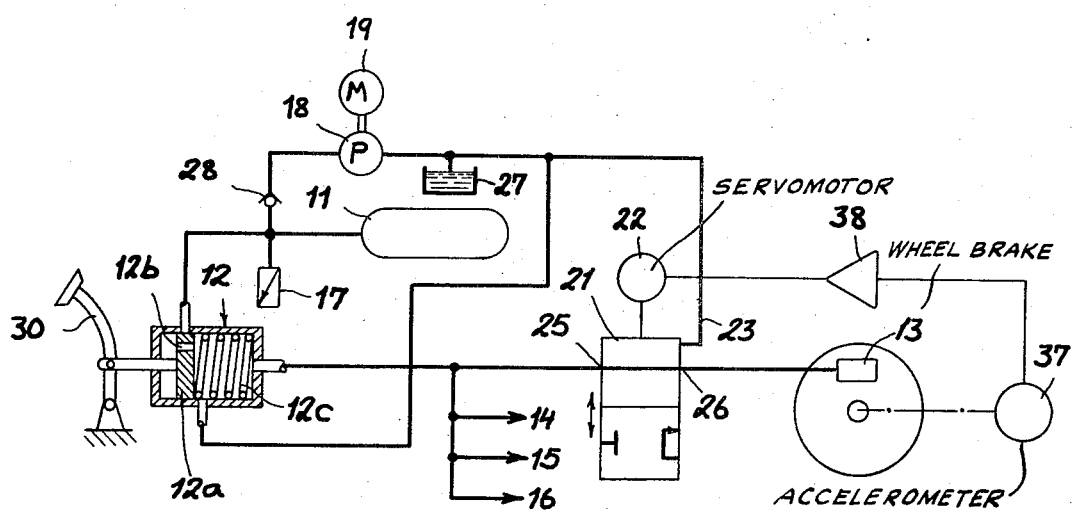
FIG. 1 is a schematic diagram of a nonskid brake system according to my invention.

FIG. 1 shows a brake system comprising a fluid-pressure accumulator 11 connected through a check valve 28 to a pump 18 powered by an electric motor 19 as a motor-vehicle oil pump. This pump 18 pumps fluid from a reservoir 27 into the accumulator 11 maintaining it at a substantially constant pressure level. A pressure meter 17 allows continuous monitoring of this pressure level. The accumulator may be of the type shown and described in *FLUID POWER*, U.S. Government Printing Office, Washington, D.C., 1966 (pages 85 f.f.) and the pressure gauge of the type described at pages 47 and 148 thereof.

The pressure from this accumulator 11 is fed into a brake-control valve 12 actuatable by a brake pedal 30. This valve may consist of a piston 12a formed with a bore 12b and biased by a spring 12c. The outlet of this valve 12 is connected to a connection 25 of a deceleration responsive valve 21. A connection 26 on this valve leads to a wheel brake 13, e.g. of the type described at pages 279 ff. of *PRINCIPLES OF AUTOMOTIVE VEHICLES*, U.S. Government Printing Office, Washington, D.C., 1956.

The nonskid system comprises an accelerometer 37 such as in the commonly assigned patent application Ser. No. 758,022 filed Sept. 6, 1968, entitled "ACCELEROMETER" by Fritz Ostwald (now U.S. Pat. No. 3,583,240). This accelerator 37 is connected through a d-c amplifier 38 and thence to a servomotor 22 (see pages 276 ff. of *SERVOMECHANISM PRACTICE*, McGraw-Hill Book Co., N.Y., Second Edition, 1960) which controls the valve 21. In case of excessive deceleration indicating an imminent or existing skid, this accelerometer 37 can actuate the valve 21 from the position shown wherein connections 25 and 26 are directly connected to a second position wherein connections 25 and 26 no longer communicate with each other and connection 26 is furthermore connected over a connection 23 to the reservoir 27 to decrease braking pressure in the brake 13 as described in my commonly assigned copending applications Ser. No. 760,769 filed Sept. 19, 1968 and Ser. No. 762,525 filed Sept. 25, 1968 entitled "NONSKID BRAKE SYSTEM HAVING HIGH PRESSURE ACCUMULATOR AND RECIPROCATING PUMP" and "EDDY-CURRENT TACHOMETERS FOR VEHICULAR BRAKE SYSTEMS AND THE LIKE", respectively (now U.S. Pat. Nos. 3,532,391 and 3,549,924).

On application of the brakes the piston 12a moves to the right in FIG. 1 against the force of the spring 12 thereby closing the port leading to the reservoir 27 and exposing the port leading to the accumulator 11 so that this can communicate through the bore 12b with the wheel brake 13 and pressurize it.

Arrows 14, 15 and 16 represent the connections for further wheel brakes and, if desired, further deceleration responsive systems for controlling them.

Figure 2:
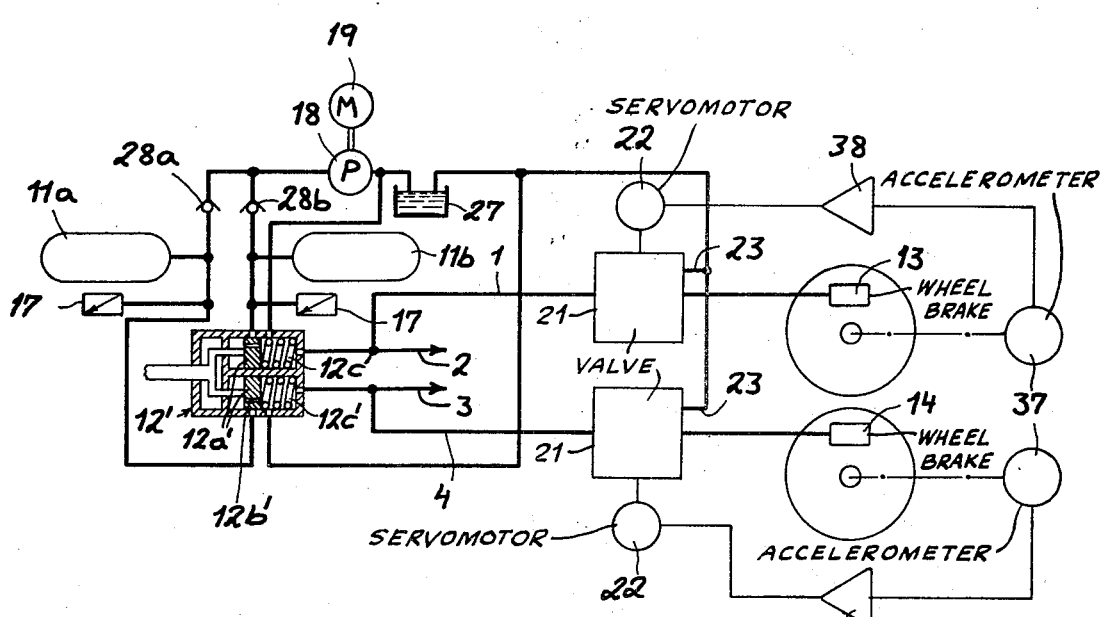
FIG. 2 is a similar view of a dual nonskid brake system according to my invention.

In FIG. 2, where the same reference numerals as in FIG. 1 apply wherever used, a brake system which resembles the FIG. 1 in every major respect is shown; however here the system is a dual-network brake system. Here a dual brake-control valve 12' having ganged pistons 12a', bores 12b' and springs 12c' are connected to two separate accumulators 11a and 11b. The latter are connected respectively through check valves 28a and 28b to a pump 18 as in FIG. 1. The principles and operation are the same here as in FIG. 1.

Figure 3:
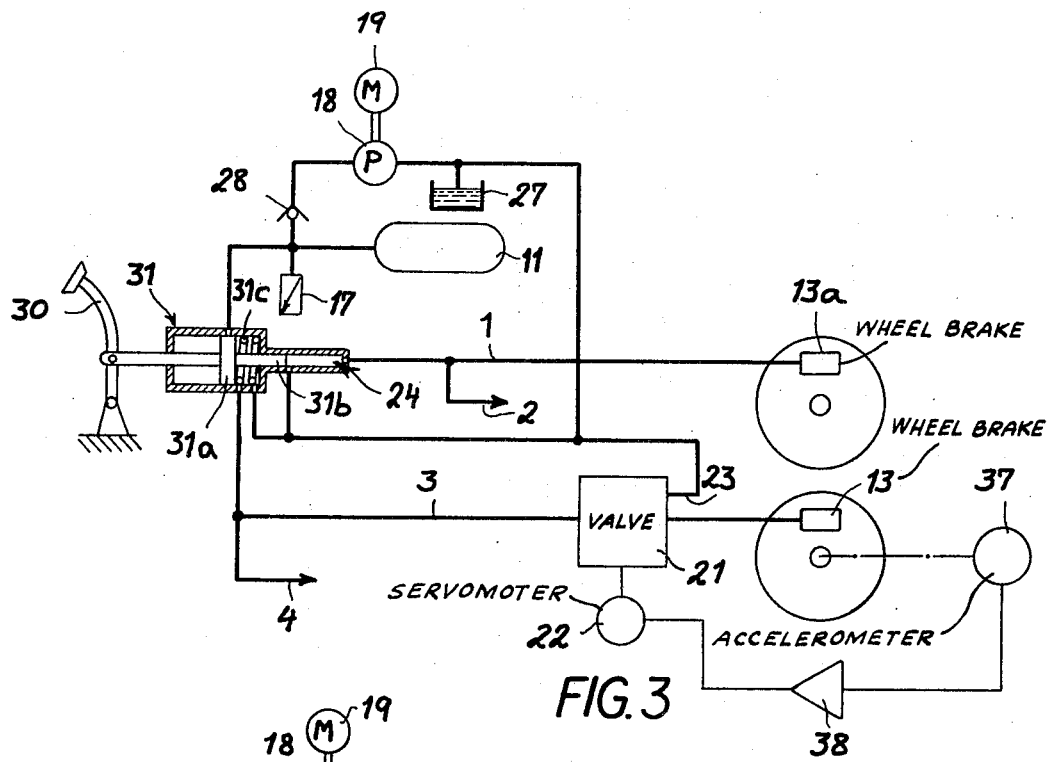
FIG. 3 is a similar view of a nonskid dual brake system according to my invention with a master cylinder for one system powered by a brake valve amplifier arrangement.

FIG. 3 shows a more complicated system wherein once again applicable reference numerals are repeated. Here a hydrodynamic brake-control valve 31 with a piston 31a biased by a spring 31c acts as power actuator for a simple master cylinder 24 with a piston 31b.

The master cylinder 24 is connected to a wheel cylinder 13a having no nonskid arrangement, and the hydrodynamic valve-amplifier 31 is connected to a valve 21 as in FIG. 1.

In this system actuation of the pedal 30 causes the piston 31a to uncover a port leading to the accumulator 11 thereby building up pressure behind the piston 31c. Further actuation, aided by the built-up pressure uncovers the port leading to the valve 21 and thereby actuates the brake 13. At the same time the piston 31b moves to the right in the master cylinder 24 to actuate the brake 13a.

No deceleration-responsive system is provided for the wheel brake 13a and master cylinder 24 since, if there were one there would be a risk during a regulation of causing the fluid pressure to drop so low in that brake as to make any subsequent braking unsure.

Figure 4:
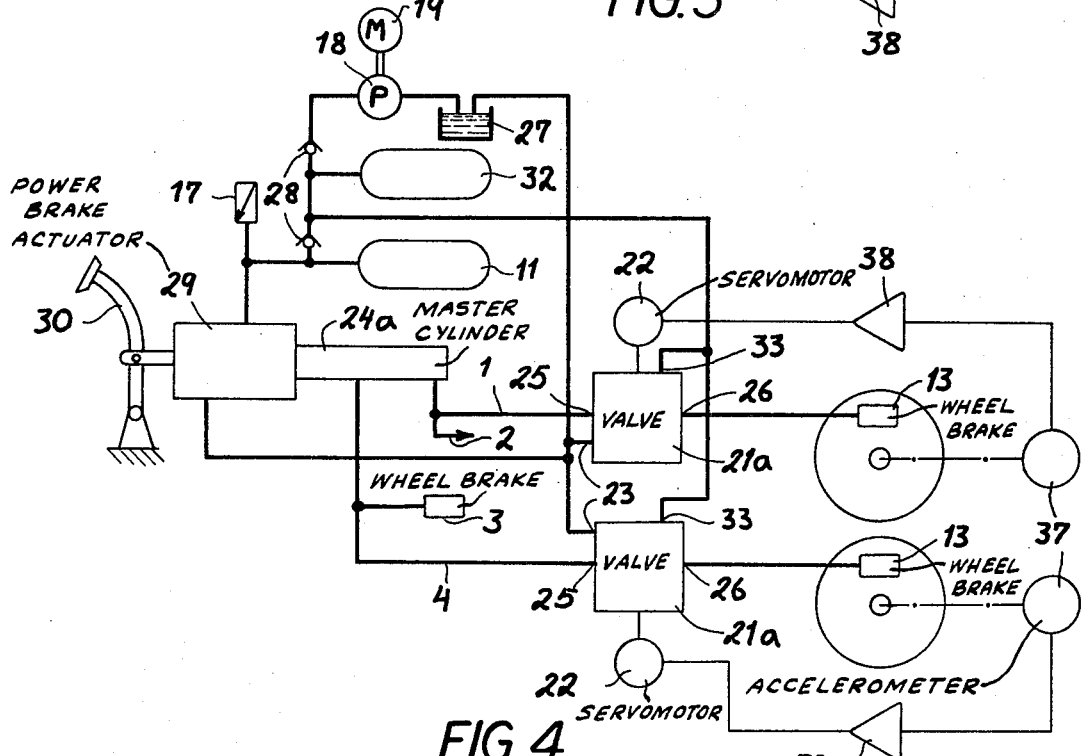
FIG. 4 is a similar view of a dual brake system according to my invention having a dual master cylinder powered by a brake-power amplifier.

FIG. 4 shows a further application of my system with once more the same reference numerals re-used wherever applicable. Here a dual-network brake system is connected to a dual master cylinder 24a such as shown in the commonly assigned copending application Ser. No. 702,594, filed Feb. 2, 1968, entitled "MASTER CYLINDER FOR HYDRAULIC INSTALLATIONS", by Gert Schrader (now U.S. Pat. No. 3,499,287). This master cylinder 24a is actuated by a power-brake actuator 29 as discussed in my copending application Ser. No. 696,350, filed Jan. 8, 1968, entitled "POWER BRAKE FOR AUTOMOTIVE VEHICLE" (now U.S. Pat. No. 3,490,231). This actuator 29 is connected to the accumulator 11 and a valve 21a.

Figure 6:
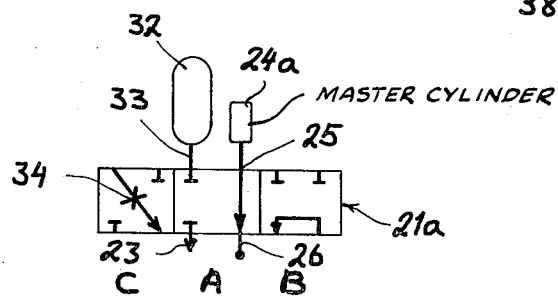
FIG. 6 is a diagrammatic view of the deceleration-responsive valve applied to the systems of FIGS. 4 and 5.

However in this system, the valve 21a has a fourth connection 33 leading to a further fluid-pressure source or accumulator 32. This valve 21a is shown in greater detail in FIG. 6 where it is shown that it has three positions, A, B and C. In position A, ports 25 and 26 only are connected. In position C—the new position—connections 33 and 26 are tied together through a pressure regulating valve or throttle 34 (see Fluid Power cited earlier).

To refill the wheel-brake system if too much pressure is drained off (in position B) from the wheel brakes 13, before, the throttle 34 is reconnected to the master cylinder 24a they are connected between the accumulator 32 and the wheel brake to build up the pressure again to the desired level for ideal braking. If this pressure were not built up again, subsequent braking would have a greatly increased pedal travel before engagement of the brakes. This would of course be undesirable. Thus the valve 21a is moved to position C when the pressure drops excessively in the brake lines.

Figure 5:
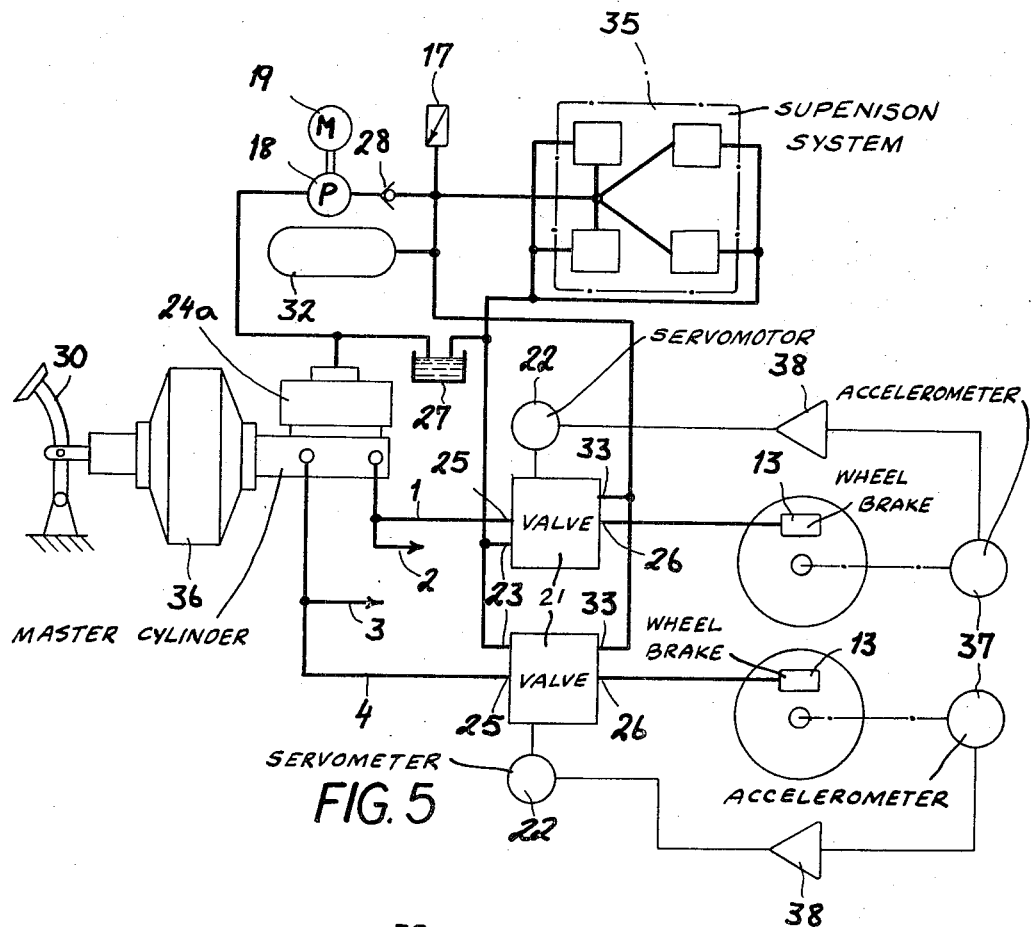
FIG. 5 is a system as shown in FIG. 4 equipped in this case with a vacuum assist pneumatic brake-power amplifier and automatic leveler.

FIG. 5 shows a system much as in FIG. 4, with applicable reference numerals from FIG. 4 used. However, in this system the master cylinder 24a is powered by a vacuum-assist power cylinder 36 as in the commonly assigned copending application Ser. No. 657,619, filed Aug. 1, 1967 by Franz Pech and Peter Spahn and entitled "VACUUM-ASSIST POWER BRAKE" (now U.S. Pat. No. 3,470,697). In addition this system cooperates with a hydraulic system 35 such body-level control arrangement described in U.S. Pat. No. 3,399,905.

This system functions just as the system of FIG. 5 except that the hydraulic pressure necessary here to reset the brakes 13 is obtained from the suspension system 35 and the master cylinder 24a is actuated by the vacuum-assist power brake 36. The valves 21 and 21a shown can be of the Moog type or electromagnetically operable.

I claim:

1. A motor-vehicle nonskid brake system comprising:
   a fluid-operated wheel brake;
   valve means connected to said brake;
   a brake-fluid reservoir connectible through said valve means to said brake;

actuating means connectible through said valve means to said brake for actuating same, said actuating means having a driver-controlled plunger and a chamber receiving said plunger, said valve means having a first position connecting said chamber of said actuating means with said brake for permitting brake-fluid flow therebetween, and a second position blocking brake-fluid flow between said actuating means and said brake while permitting brake-fluid flow between said brake and said reservoir;

a fluid pressure source including a pressure accumulator maintained at an elevated fluid pressure independently of said actuating means and connected to said valve means for pressurization therethrough of said brake, said source being connected to said chamber at least upon operation of said plunger to actuate said brake and to render said plunger responsive to the presence of said source; and means responsive to motor-vehicle deceleration for controlling said valve means, said actuating means including a master cylinder and said valve means having a third position blocking brake-fluid flow between said brake and said reservoir and between said brake and said actuating means while permitting brake-fluid flow between said source and said wheel brake.

2. A dual-network brake system as defined in claim 1, further comprising a fluid-operated second wheel brake, and second actuating means connected to said second brake and linked with the first-mentioned actuating means for joint operation therewith.

3. The system defined in claim 2 wherein said second actuating means is said master cylinder.

4. The system defined in claim 1, wherein said source includes pump means for displacing brake fluid from said reservoir into said accumulator for pressurizing same, and a check valve between said pump means and said accumulator.

5. The system defined in claim 1, further comprising a throttle valve connectible between said source and said wheel brake in said third position.

6. The system defined in claim 5 further comprising a second fluid pressure source connectible to said brake in said third position of said valve means.

7. A motor vehicle nonskid brake system comprising:
a fluid-operated wheel brake;
valve means connected to said brake;
a brake-fluid reservoir connectible through said valve means to said brake;
actuating means connectible through said valve means to said brake for actuating same, said actuating means having a driver-controlled plunger and a chamber receiving said plunger, said valve means having a first position connecting said chamber of said actuating means with said brake for permitting brake-fluid flow therebetween, and a second position blocking brake-fluid flow between said actuating means and said brake while permitting brake-fluid flow between said brake and said reservoir;

a fluid-pressure source including a pressure accumulator maintained at an elevated fluid pressure independently of said actuating means and connected to said valve means for pressurization therethrough of said brake, said source being connected to said chamber at least upon operation of said plunger to actuate said brake and to render said plunger responsive to the presence of said source; and means responsive to motor-vehicle deceleration for controlling said valve means;

said actuating means including a brake master cylinder for displacing brake fluid connected with said reservoir for drawing brake fluid therefrom, and operating means for actuating said master cylinder;

said fluid-pressure source including a pump connected to said accumulator and drawing fluid from said reservoir for maintaining said source at said elevated fluid pressure, and a check valve between said pump and said accumulator for unidirectionally admitting fluid to said accumulator from said pump;

said valve means including a three-position valve having a third position wherein said master cylinder is cut off and said accumulator is connected to said brake independently of said actuating means; and said means responsive to motor-vehicle deceleration including a servomotor connected to said valve means and control means coupled with said vehicle wheel associated with said wheel brake for operating said servomotor.

8. The brake system defined in claim 7 wherein said operating means includes a fluid-operated brake-pedal-controlled amplifier connected to said master cylinder.

9. The brake system defined in claim 8 wherein said amplifier is connected to said accumulator for operation with the pressure thereof.

10. The brake system defined in claim 8 wherein said amplifier is a vacuum-assist power cylinder.

11. The brake system defined in claim 7 wherein said accumulator and said pump form part of an auxiliary hydraulic system for said vehicle adapted to operate a load other than said brake system.

* * * * *